(12) United States Patent
Sinclair

(10) Patent No.: US 10,287,058 B2
(45) Date of Patent: May 14, 2019

(54) LOCKING AND FOLDING ASSEMBLY FOR ATTACHMENT TO A BUCKET OR OTHER CONTAINER

(71) Applicant: ABTEC INC., Bristol, PA (US)

(72) Inventor: William S. Sinclair, Langhorne, PA (US)

(73) Assignee: Abtec, Inc., Bristol, PA (US)

(*) Notice: Subject to any disclaimer, the term of this patent is extended or adjusted under 35 U.S.C. 154(b) by 17 days.

(21) Appl. No.: 15/590,488

(22) Filed: May 9, 2017

(65) Prior Publication Data

US 2017/0320630 A1    Nov. 9, 2017

Related U.S. Application Data

(60) Provisional application No. 62/333,359, filed on May 9, 2016.

(51) Int. Cl.
*B65D 25/24* (2006.01)
*B65D 25/20* (2006.01)
*B44D 3/14* (2006.01)

(52) U.S. Cl.
CPC ............ *B65D 25/24* (2013.01); *B44D 3/14* (2013.01); *B62B 2202/028* (2013.01); *B65D 25/20* (2013.01)

(58) Field of Classification Search
CPC . B65D 25/24; B65D 25/20; Y10T 403/32377; Y10T 403/32361; Y10T 403/32352; A47B 3/08; B44D 3/14; B62B 2202/028
USPC .......... 248/188.6, 188.8, 188.9, 188.91, 151, 248/188.3, 188, 463, 528, 166, 351, 248/354.6, 529, 158, 354.5, 477, 478, 248/496, 408, 407, 404; 403/326, 329; 108/127, 125
See application file for complete search history.

(56) References Cited

U.S. PATENT DOCUMENTS

| | | | |
|---|---|---|---|
| 1,012,302 A | 12/1911 | Van Horn | |
| 1,393,023 A | 10/1921 | Hyde | |
| 1,621,260 A | 3/1927 | Lindemuth | |
| 2,181,596 A | 11/1939 | Conterman | |
| 2,210,930 A | 8/1940 | Heard | |
| 2,643,854 A * | 6/1953 | Johnson | B25D 1/045 254/26 E |
| 2,683,014 A | 7/1954 | Sumen et al. | |
| 3,396,928 A * | 8/1968 | Lay | A47B 3/0815 108/129 |
| 4,144,822 A * | 3/1979 | Roberts | A47B 3/0815 108/125 |
| 4,209,080 A * | 6/1980 | Douglas | F04B 39/0246 184/6.16 |

(Continued)

*Primary Examiner* — Kimberly T Wood
(74) *Attorney, Agent, or Firm* — Vos-IP, LLC

(57) ABSTRACT

A leg assembly capable of easy attachment to a container, having an elongated leg and a bracket, where the bracket contains a mounting pocket, two slots, substantially parallel to one another, and wherein at one end of the bracket there is disposed an L-shaped flange, and wherein the elongated leg contains a pin on each side of an end of the leg, and mounted so that the leg may rotate in the mounting pocket of the bracket, and wherein the leg has an outward protruding pin sized and shaped to fit into the two parallel recesses, and wherein the pin is formed on a flexible arm on the leg capable of being depressed to move the pin inward.

10 Claims, 10 Drawing Sheets

(56) References Cited

U.S. PATENT DOCUMENTS

| | | | | |
|---|---|---|---|---|
| 4,383,488 A * | 5/1983 | Macho | A47B 3/08 | |
| | | | 108/129 | |
| 4,385,619 A * | 5/1983 | Casinelli | F24C 1/16 | |
| | | | 108/127 | |
| 4,505,408 A * | 3/1985 | Sagol | B65D 90/14 | |
| | | | 108/127 | |
| 4,548,379 A * | 10/1985 | Seely | G09F 7/22 | |
| | | | 248/160 | |
| 4,605,099 A * | 8/1986 | Crum | F16M 11/38 | |
| | | | 182/155 | |
| 4,744,536 A * | 5/1988 | Bancalari | A61M 5/1415 | |
| | | | 248/125.8 | |
| 4,804,064 A * | 2/1989 | Coultrup | B25H 1/06 | |
| | | | 182/155 | |
| 5,082,222 A * | 1/1992 | Hsu | F16M 11/242 | |
| | | | 248/170 | |
| 5,310,145 A * | 5/1994 | Chen | F21S 6/006 | |
| | | | 248/170 | |
| 5,325,990 A | 7/1994 | Temple | | |
| 5,433,463 A | 7/1995 | Finley | | |
| 5,470,037 A * | 11/1995 | Willis | A61G 7/0503 | |
| | | | 248/125.9 | |
| 5,839,706 A * | 11/1998 | Liu | A47D 13/043 | |
| | | | 248/170 | |
| 5,889,656 A * | 3/1999 | Yin | H05K 7/1431 | |
| | | | 361/740 | |
| 6,000,960 A * | 12/1999 | Wang | H01R 12/7005 | |
| | | | 439/327 | |
| 6,056,583 A * | 5/2000 | Lee | H01R 12/7005 | |
| | | | 439/157 | |
| 6,311,941 B1 * | 11/2001 | Feldmeyer | A47B 97/00 | |
| | | | 248/188.8 | |
| 6,776,379 B2 | 8/2004 | Sherer et al. | | |
| 6,935,644 B1 | 8/2005 | Oranday | | |
| 7,448,587 B2 * | 11/2008 | Han | A47B 91/00 | |
| | | | 211/41.6 | |
| 7,516,679 B2 * | 4/2009 | Bell | G01D 11/30 | |
| | | | 73/855 | |
| 7,669,815 B2 * | 3/2010 | Clewett | E04H 12/2238 | |
| | | | 248/163.1 | |
| 2005/0077695 A1 | 4/2005 | Sherer et al. | | |

* cited by examiner

LOCKING AND FOLDING ASSEMBLY FOR ATTACHMENT TO A BUCKET OR OTHER CONTAINER

CROSS REFERENCE TO RELATED APPLICATION

This application claims the benefit of U.S. Provisional Application Ser. No. 62/333,359, filed May 9, 2016, the disclosure content of which is hereby incorporated by reference in its entirety.

FIELD OF THE INVENTION

This invention relates to a leg assembly which is capable of easy, secure attachment to a bucket or other container and which is capable of assuming a down-locked position, in which the leg is extended downward to support a bottom of a bucket above and off the ground or floor, and an up folded position, in which the leg is folded upward against a side of the bucket so that the bottom of the bucket or the bottom of the leg assembly can sit directly on the ground or floor.

BACKGROUND OF THE INVENTION

Although buckets and pails are widely available inexpensively from hardware stores, in use, these buckets and pails are placed on the ground or floor. Thus, if a user wants to retrieve an item in the bottom of the bucket or pail, the user must bend down to reach the item in the bottom of the bucket or pail. If the items are repeatedly retrieved, such bending down for retrieval can become tiresome. An example of such multiple items that might be placed in a bucket for repeated retrieval are baseballs or tennis balls. Another example would be paint or cleaning liquid. Bending down to reach into a bucket can be minimized if the height of the bucket is raised. If a bucket or container is placed on top of an available support of some kind to raise the bucket off of the ground or floor, if the bucket is to be moved, the support must also be moved. Also, if paint or a cleaning liquid is placed in the bucket, the liquid could spoil the support.

Prior legs have required an attachment mechanism that damages the bucket, or requires a retaining ring or other device to secure to the bucket. These features add cost, add weight, and may damage the bucket being supported. Accordingly, these devices have not met commercial success, despite the fact that buckets are ubiquitous in many industries, and that such a device would benefit all users of buckets.

SUMMARY OF THE INVENTION

The present invention comprises embodiments directed to a leg assembly capable of easy, secure attachment to a bucket or other container and is capable of assuming a down-locked position, in which the leg of the leg assembly is extended downward to support a bottom of a bucket above and off the ground, and an up-folded position, in which the leg is folded upward against a side of the bucket so that the bottom of the bucket or the bottom of the mounting bracket sits directly on the ground.

The leg assembly has two parts, an elongated leg and a substantially U shaped mounting bracket. In each side of the bracket, there is a mounting pocket in which a pin disposed on each side of an end of the leg is mounted so that the leg may rotate in the bracket. At one end of bracket, there is an L shaped flange with a protruding tab. This flange and tab are sized and shaped to support the bottom of a bucket and to grasp a rim at the bottom of the bucket. An adhesive layer is used to attach the side of bracket to the bucket's outer side. The bracket has two slots, and at least one slot has a recess. The leg has an outward protruding pin on one side of the leg which is sized, positioned and shaped to fit into the recess. The pin is formed on a flexible arm formed in the leg so that the arm can be depressed to move the pin inward.

To move the leg into the down locked position, the leg is rotated, thereby sliding the pin on the leg into the slot and recess in the side of the bracket. To move the leg from the down locked position into the up folded position, the flexible arm tab is depressed until the pin is no longer protruding into the recess, and the leg is rotated until the pin slides into the other slot in the side of the bracket.

The leg assembly of the present provides an inexpensive, simple to operate, easily portable, and reliable way to securely elevate a bucket from the ground or a floor, while also providing a way to compactly fold the legs during storage of the bucket with the attached legs or when it is desired to place the bottom of the bucket directly on the ground or a floor. By providing that the legs can be locked in the down position, the likelihood is substantially reduced that the legs will collapse should the bucket be jarred. Additionally, by using an adhesive layer to attach the leg assembly to the bucket rather than nuts and bolts or a frame around the bucket, assembly is easy, and the integrity of the bucket will not be compromised. Because any number of leg assemblies can be used, the size, shape and weight of the bucket or container to be supported by the leg assembly of the present invention is not limited.

Furthermore, when the leg is locked into the down position, the leg is angled away from the direct force of the bucket on the flange. This directs the force to the flange and forces the edge of the bracket against the bucket, thus assisting in maintaining the bracket to the bucket.

In a further embodiment, the invention is directed towards a leg assembly comprising two parts, an elongated leg and a substantially U shaped mounting bracket; wherein, each side of the bracket comprises a mounting pocket, two slots, substantially parallel to one another and at least one slot has a recess, wherein at one end of the bracket, there is an L shaped flange with a protruding tab; wherein said flange and tab are sized and shaped to support the bottom of a bucket and to grasp a rim at the bottom of the bucket; wherein the elongated leg comprises a pin disposed on each side of an end of the leg is mounted so that the leg may rotate within the mounting pocket in the bracket; wherein the leg has an outward protruding pin on one side of the leg, which is sized, positioned, and shaped to fit into the two parallel recesses; and wherein said pin is formed on a flexible arm formed on the leg and can be depressed to move the pin inward.

A further embodiment is directed to a leg assembly comprising two parts, an elongated leg and a substantially U shaped mounting bracket; wherein, each side of the bracket comprises a mounting pocket, a surface facing side, two slots, substantially parallel to one another and at least one slot has a recess, wherein at one end of the bracket, there is an L shaped flange with a protruding tab; wherein said flange and tab are sized and shaped to support the bottom of a container; wherein the elongated leg comprises a pin disposed on each side of an end of the leg is mounted so that the leg may rotate within the mounting pocket in the bracket; wherein the leg has an outward protruding pin on one side of the leg, which is sized, positioned, and shaped to fit into the two parallel recesses; and wherein said pin is formed on a flexible arm formed on the leg and can be depressed to move the pin inward.

In certain embodiments, the mounting pocket and the surface facing side are not parallel to one another. Accordingly, to accommodate the leg to allow for compact storage in the up position, the elongated leg comprises an inflection point.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims

BRIEF DESCRIPTION OF THE DRAWINGS

In the drawings, wherein like reference numerals delineate similar elements throughout the several views.

DETAILED DESCRIPTION OF THE EMBODIMENTS

Figure 1A:
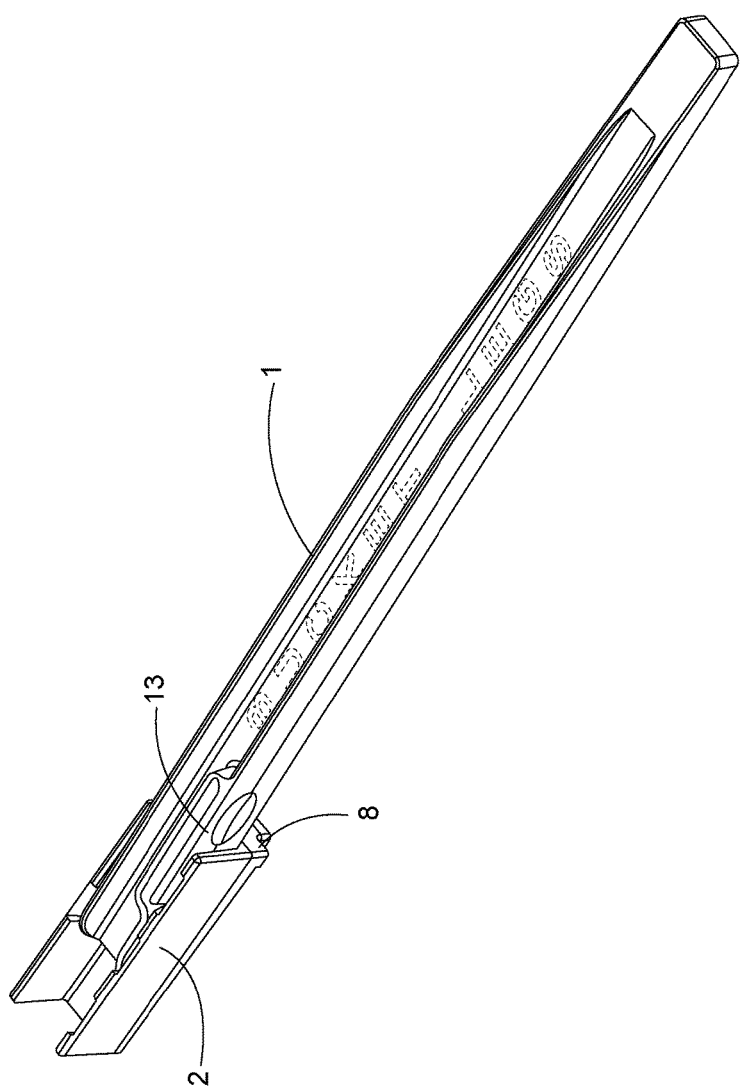
FIGS. 1A and 1B shows the leg assembly of the present invention in the down-locked position and the up-folded position.
Figure 1B:
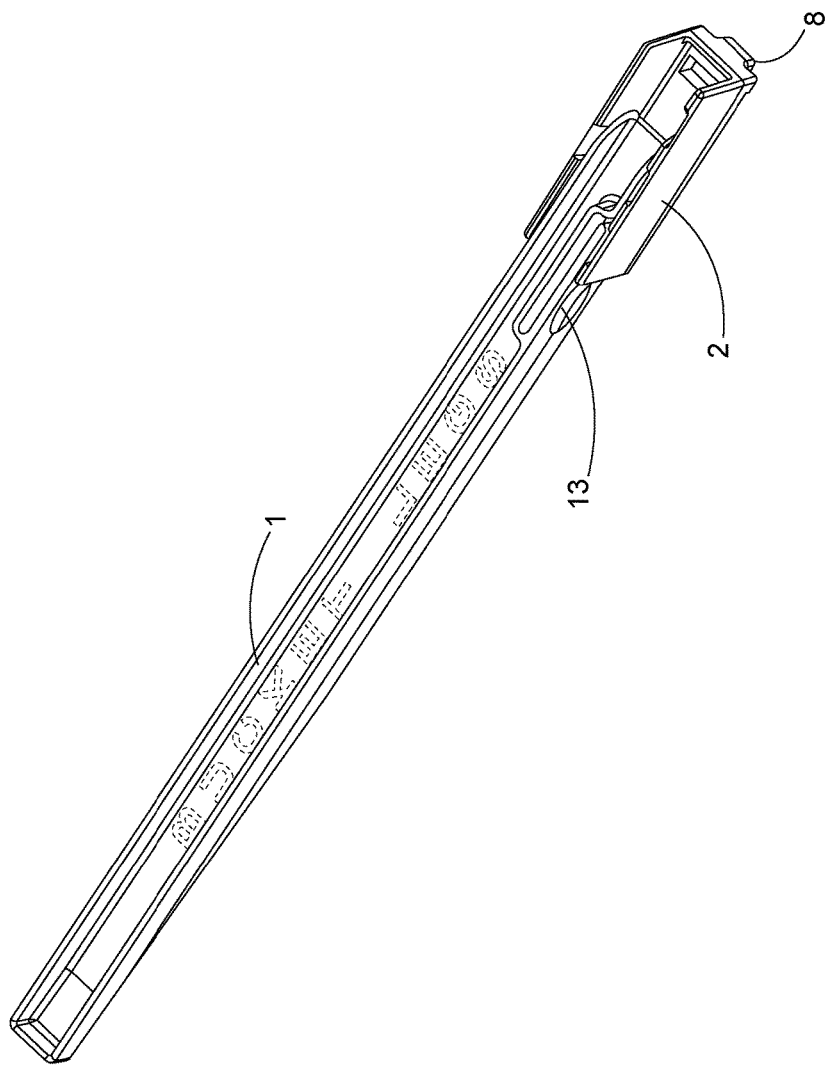

Referring to FIG. 1A, the leg assembly has two parts, an elongated leg 1 and a substantially U shaped mounting bracket 2. In FIG. 1A, the leg 1, which is rotatably mounted in bracket 2, is shown in the down-locked position, and in FIG. 6, the leg assembly is shown attached to a bucket 3 with the leg 1 in bracket 2 in the down locked position. In FIG. 1B, the leg 1 is shown in the up folded position, and in FIG. 7, the leg assembly is shown attached to a bucket 3 with the leg 1 in bracket 2 in the up folded position. The length of leg 1 is selected to be appropriate for the particular intended use. Thus, if the intended use requires that the bottom of the bucket 3 be 15" above the ground or floor, leg 1 is about 15" in length. For other bucket heights, the length of leg 1 is appropriately sized in length, or the leg may be adjustable in length to allow for adjustment based on the needs of the particular user.

Figure 2A:
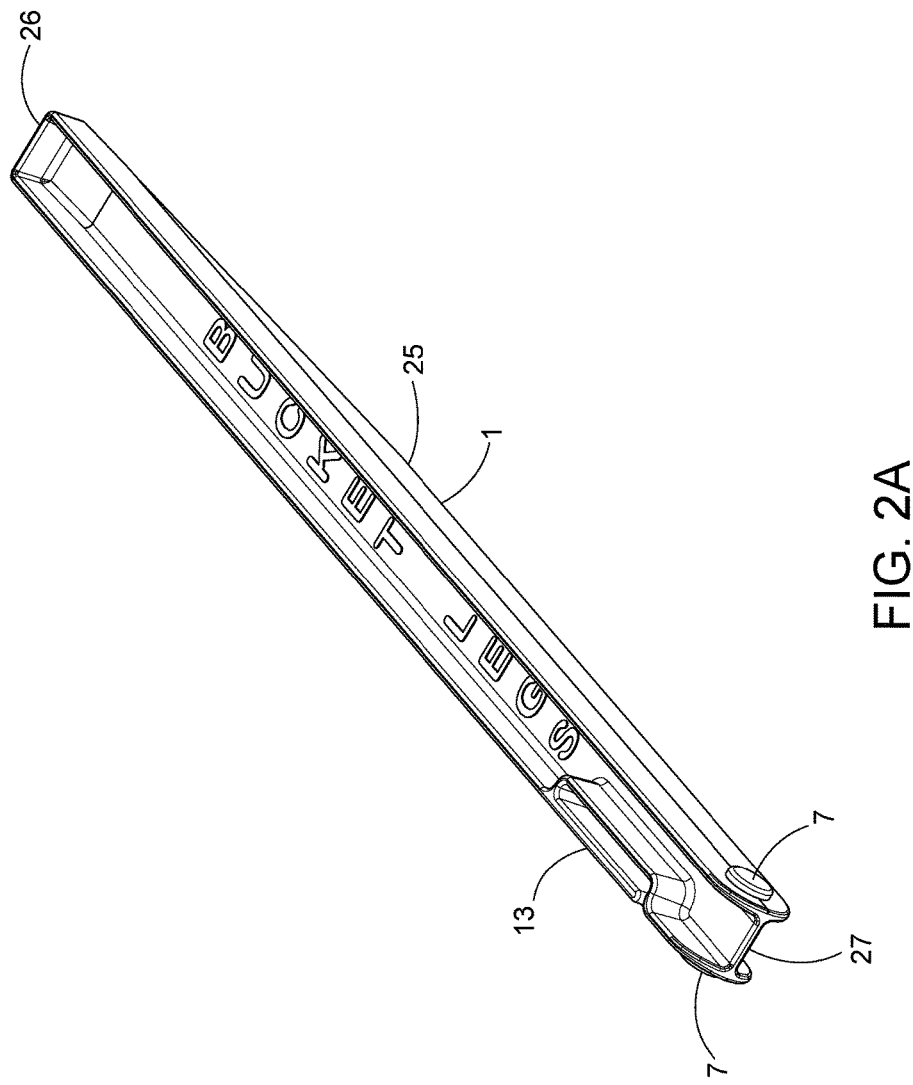
FIGS. 2A and 2B show the leg assembly.
Figure 2B:
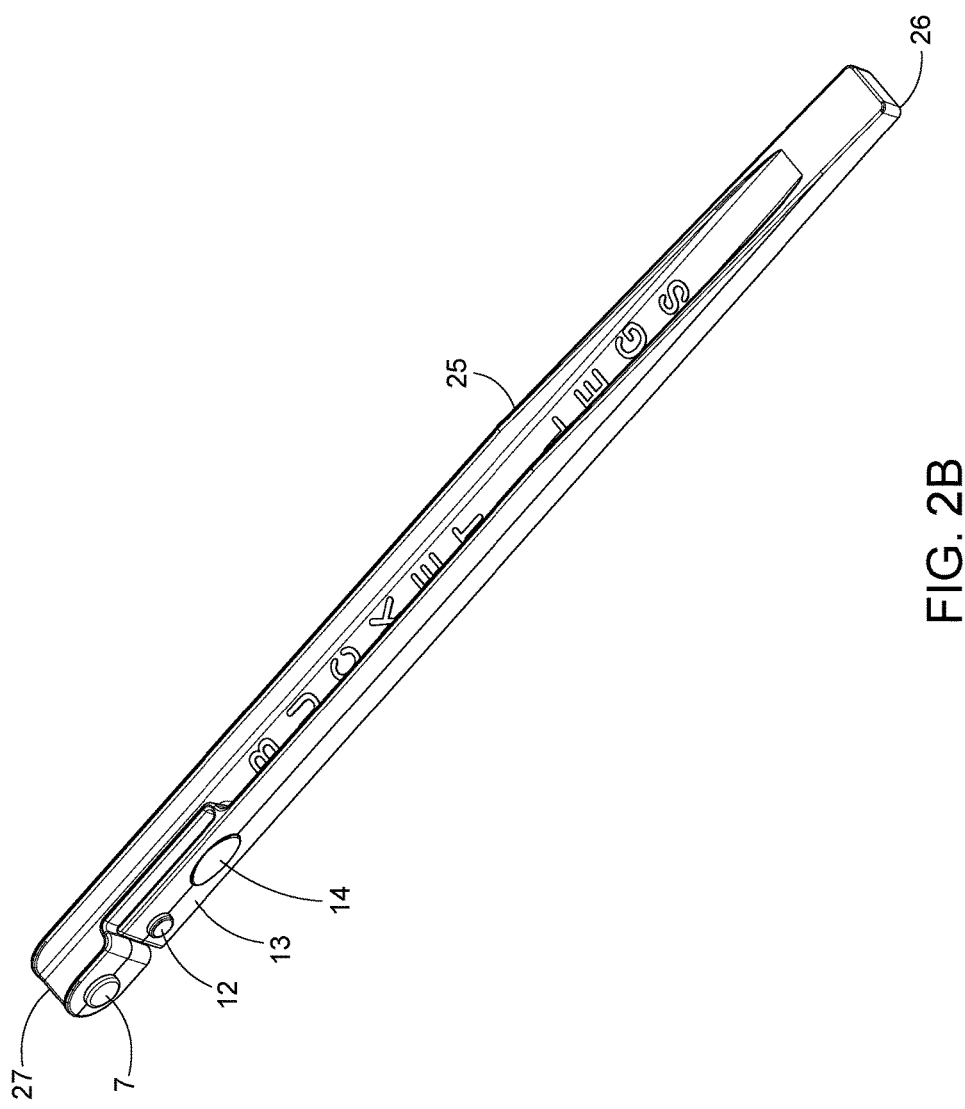

As is shown in FIGS. 2A and 2B, the leg comprises a bracket end 27, a standing end 26, and an inflection point 25 on the leg. The inflection point 25 results in the standing end 26 being narrower than the bracket end 27, and allows the leg to engage to a bucket when in the up position, as detailed in FIG. 7. Further details in FIGS. 2A and 2B are the mounting pins 7, which engage to a mounting pocket 6 in the bracket 2. Further depicted is the arm 13, while FIG. 2B specifically details the pin 12 on the arm 13, and a protruding tab 14.

Figure 3A:
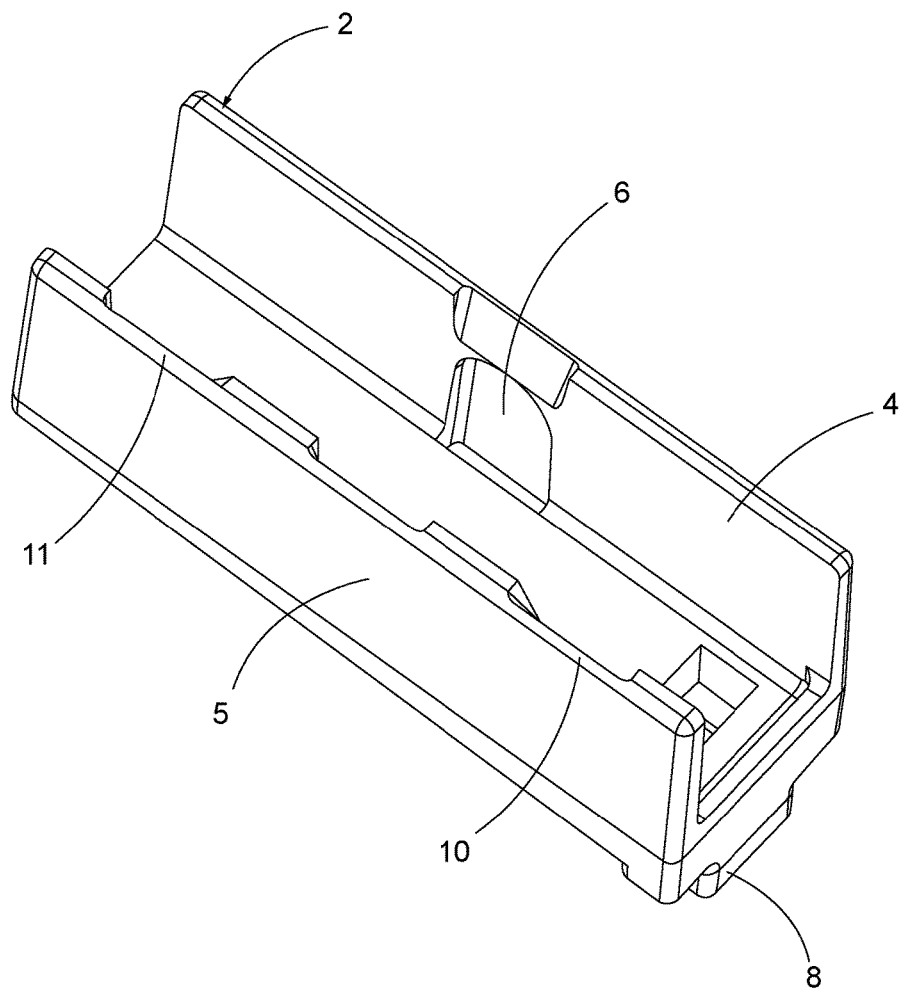
FIGS. 3A and 3B provide opposite perspective drawing of the bracket portion of the leg assembly of the present invention.

As shown in FIG. 3A, bracket 2 is substantially U shaped in cross section, having two sides 4, 5. In each side 4, 5, there is a mounting pocket 6 in which a mounting pin 7, disposed on each side of an end of the leg 1, is mounted, as shown in FIGS. 2A and 2B. Mounting of the mounting pins 7 of leg 1 into the two pockets 6 allows leg 1 to rotate in bracket 2.

Figure 3B:
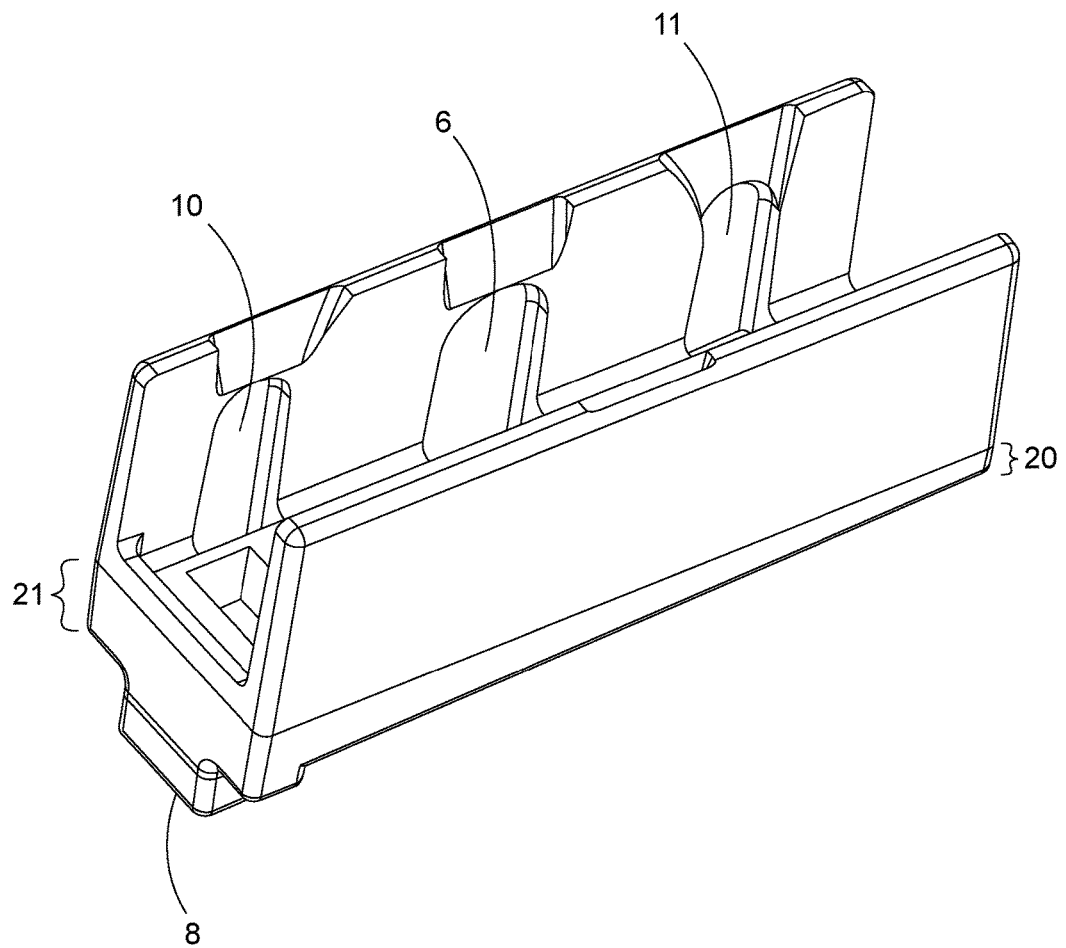

As shown in FIG. 3B, the opposite side of the bracket 2 contains the slots 10 and 11, for receiving the pin 12. Further depicted in FIG. 3B is the depth of the bracket 2. For example, at the end having flange 8, the bracket has a wider width 21 than the width 20 at the opposing end. This width angles the mounting pocket slightly when attached to a bucket. This angle forces the bucket legs away from the bucket, as depicted by the angle 31 in FIG. 6. Furthermore, when the leg 1, is folded in the up position, the angle necessitates the inflection point 25, to allow for the leg to sit nearly flush to the bucket.

Figure 4:
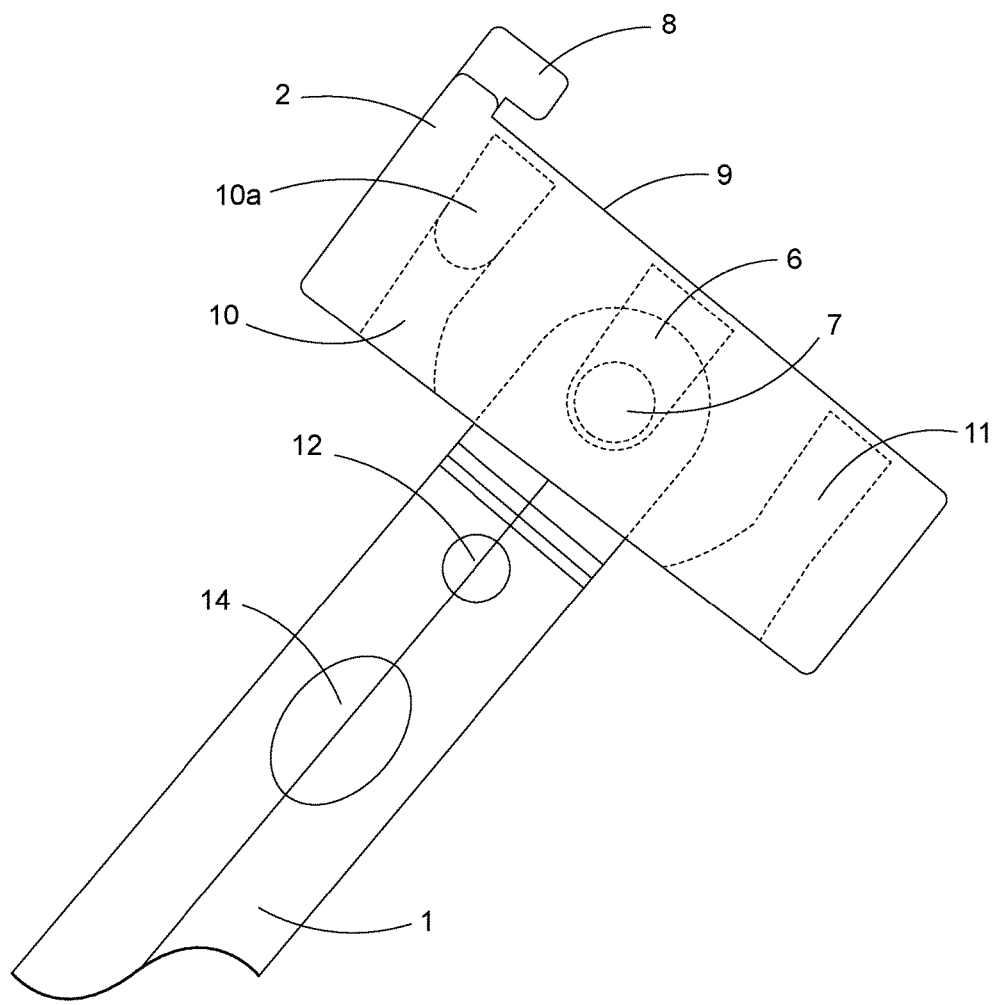
FIG. 4 is a cross sectional drawing of the bracket portion and leg portion of the leg assembly of the present invention.
Figure 5:
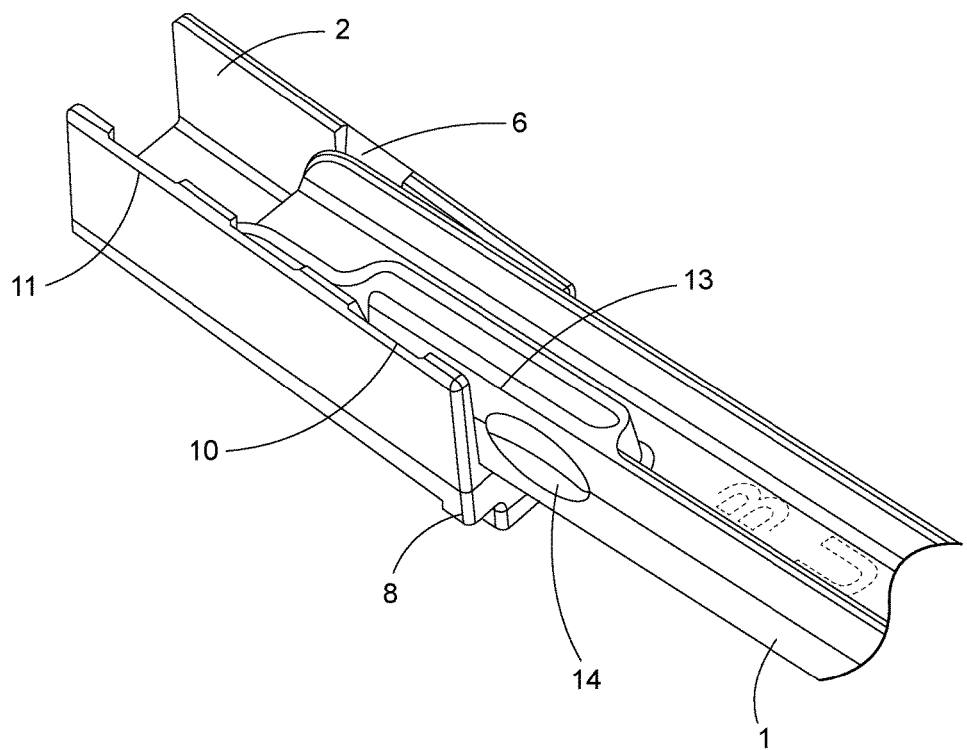
FIG. 5 is a detail of FIG. 1A.

As shown in FIGS. 3A, 3B, and 4, on the side of bracket 2 that connects sides 4, 5, and at one end of bracket 2, there is an L shaped flange 8 with a protruding tab. This flange 8 and its tab are sized and shaped to support the bottom of the bucket 3 and to grasp a rim at the bottom of the bucket 3, as discussed below. An adhesive layer 9 is attached to the surface facing side of bracket 2 that connects sides 4, 5. Adhesive layer 9 may be in the form of a tape with adhesive on both sides, a glue, cement or other adhesive, plastic weld, or metal weld, and half of a hook and loop material, or combinations thereof.

Referring to FIG. 4, bracket 2 has two slots 10, 11, one near each end of bracket 2. The slots are formed into one side 5 of bracket. One slot 10 has a recess 10a which renders a portion of the slot 10 deeper than the remainder of the slot 10. The leg 1, having an outward protruding pin 12 on one side of leg 1, engages to such slots 10 and 11. Pin 12 has a diameter smaller than the width of slots 10, 11 and slightly smaller than the diameter of recess 10a. Pin 12 is formed on a flexible arm 13, formed in leg 1. Arm 13 is formed in leg 1 so that it can be depressed and thereby move pin 12 inward. An outward protruding tab 14 is formed in arm 13 to indicate where a user may press arm 13.

Figure 6:
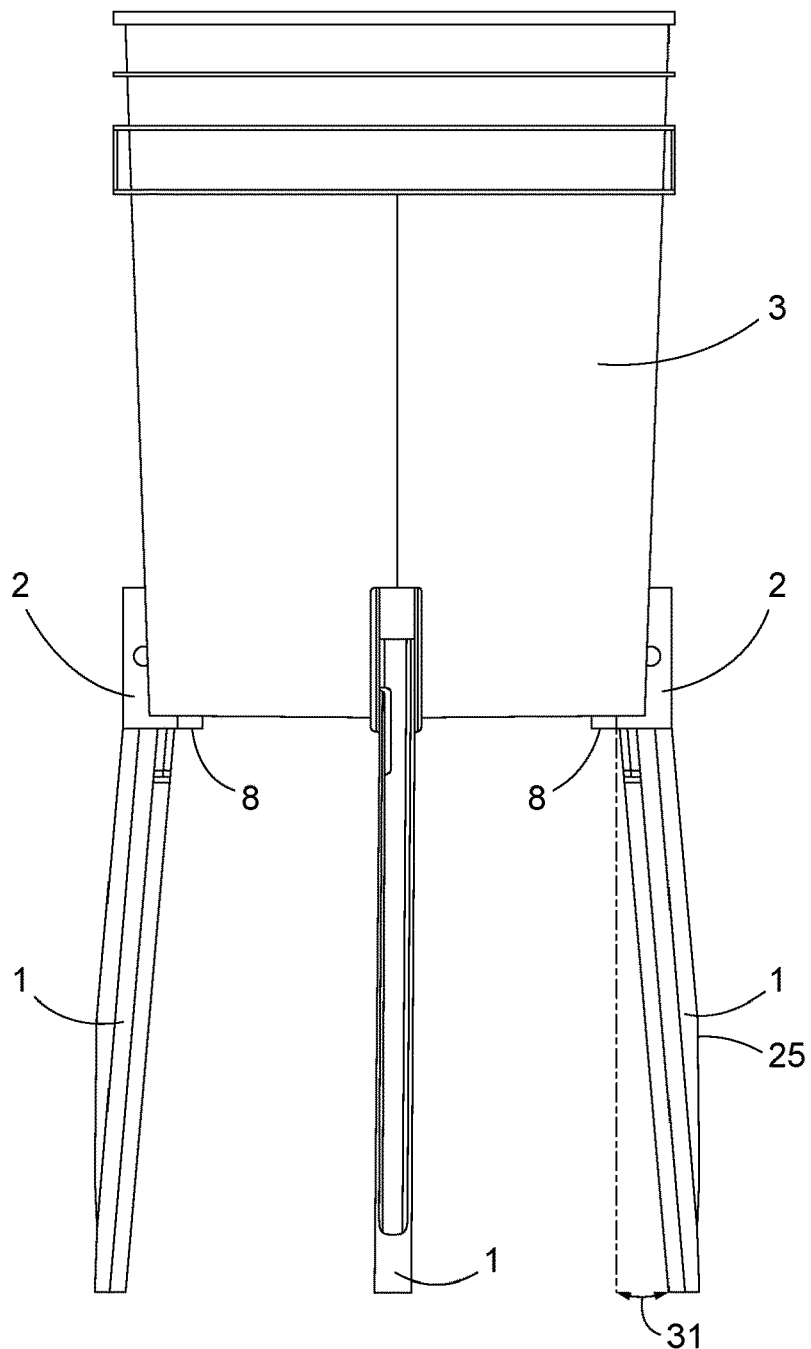
FIG. 6 shows three leg assemblies of the present invention in the down-locked position and attached to a bucket.

The leg assembly is attachable to a container, such as a bucket 3 by the adhesive layer 9 on the side of bracket 2 that connects sides 4, 5. If the adhesive layer 9 is one portion of a hook and loop strip, an opposite side of the strip is attached at an appropriate position near the bottom the bucket 3. The protruding tab of the L shaped flange 8 at an end of the bracket 2 grabs a rim at the bottom of the bucket 3, while the reminder of the L shaped flange 8 supports the weight of the bucket 3. As the lip of the bottom of the bucket sits within the L-shaped flange 8, the weight of the bucket is applied to this L-shaped flange 8. Furthermore, as the forces press down on the L-shaped flange 8, the leg angle 31, as depicted in FIG. 6, further presses the bracket 2 towards the container. Accordingly, the adhesive layer 9, does not need to support the weight of the bucket, it is provided to simply maintain the bracket 2 adjacent to the bucket 3.

Figure 7:
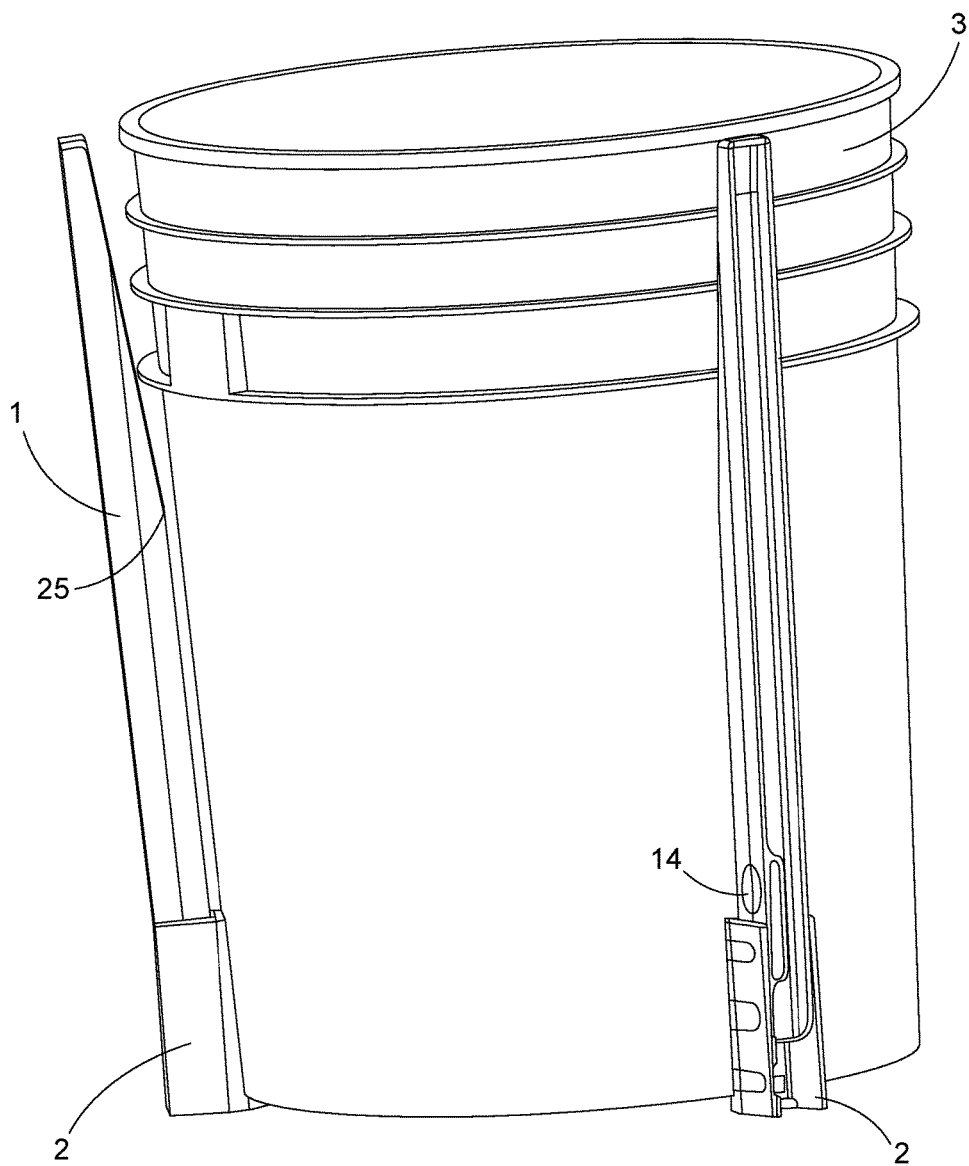
FIG. 7 shows three leg assemblies of the present invention in the up-folded position and attached to a bucket.

When leg 1 is mounted into bracket 2 (either attached to a container or not), leg 1 can easily transition from the up folded position shown in FIGS. 1B and 7 to the down locked position shown in FIGS. 1A and 6, and vice versa. When in the up folded position shown in FIGS. 1B and 7, pin 12 is positioned in slot 11. To move leg 1 into the down locked position shown in FIGS. 1A and 6, leg 1 is rotated about pins 7, thereby sliding pin 12 out of slot 11 into slot 10 and recess 10a. When pin 12 enters recess 10a, leg 1 is locked into the down locked position. To move leg 1 from the down locked position shown in FIGS. 1A and 6 into the up folded position shown in FIGS. 1B and 7, tab 14 is depressed until pin 12 is no longer protruding into recess 10a, and leg 1 is rotated about pins 7, until pin 12 slides into slot 11.

As best seen in FIGS. 6 and 7, leg 1 is preferably shaped so that, in the down locked position, leg 1 is directed slightly outward at angle 31, relative to bucket 3 to provide a more stable support arrangement. Furthermore, the slightly outward position allows the forces from the weight of the bucket to be applied to the L-shaped flange 8, which supports the weight of the bucket. Additionally, leg 1 is preferably shaped so that, in the up fold position, the end 26 of leg 1 does not interfere with any ribbing on the outside upper edge of bucket 3 to provide a more compact assembly. This is created by inflection 25, which reduces the width of the end 26 as compared to the bracket end 27 of the leg.

Leg 1 and bracket 2 are preferably formed of a plastic material to minimize manufacturing costs, although these elements may also be formed of a metal, wood, or composites, or other natural or synthetic material.

By using hook and loop strips to attach the leg assembly 1, 2 to the bucket 3, the leg assembly can be removed from the bucket after attachment. However, other suitable fasteners, including adhesives, double sided tape, and the like can be utilized.

Although FIGS. 6 and 7 show three leg assemblies attached to a bucket, more than three leg assemblies may be used depending upon the size and shape of the container to which the leg assemblies are attached. Indeed, in larger commercial applications, the legs can be easily added to support a structure, with a leg on multiple legs on each side of a container.

Thus, while there have been shown and described and pointed out fundamental novel features of the present invention as applied to a preferred embodiment thereof, it will be understood that various omissions and substitutions and changes in the form and details of the devices described and illustrated, and in their operation may be made by those skilled in the art without departing from the spirit of the present invention. For example, it is expressly intended that all combinations of those elements which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A leg assembly comprising two parts, a first part being an elongated leg and a second part being a substantially U shaped mounting bracket;
   wherein, each side of the bracket comprises a mounting pocket, two slots, substantially parallel to one another and at least one of the two slots has a recess, wherein at one end of the bracket, there is an L shaped flange with a protruding tab at the end of said flange;
   wherein said flange and tab are sized and shaped to support a bottom of a bucket wherein said L shaped flange and said protruding tab grasp a rim at the bottom of the bucket between said L shaped flange and said protruding tab;
   wherein the elongated leg comprises a pin disposed on opposing sides of an end of the leg is mounted so that the leg may rotate within the mounting pocket in the bracket;
   wherein the leg has an outward protruding pin on one of the opposing sides of the leg, which is sized, positioned, and shaped to fit into the two slots; and
   wherein said outward protruding pin is formed on a flexible arm formed on the leg, the flexible arm can be depressed to move the outward protruding pin inward.

2. The leg assembly of claim 1, wherein the mounting bracket has a surface facing external side and wherein the mounting pocket is not parallel with the surface facing external side of the bracket.

3. The leg assembly of claim 1, wherein the elongated leg comprises an inflection point.

4. A leg assembly comprising two parts, the first part being an elongated leg and the second part being a substantially U shaped mounting bracket;
   wherein, each side of the bracket comprises a mounting pocket, a surface facing side, two slots, substantially parallel to one another and at least one of the two slots has a recess, wherein at one end of the bracket, there is an L shaped flange with a protruding tab at the end of said L shaped flange;
   wherein said flange is defined to support a bottom of a container and said protruding tab securing around a rim on the bottom of a container;
   wherein the elongated leg comprises a pin disposed on opposing sides of an end of the leg is mounted so that the leg may rotate within the mounting pocket in the bracket;
   wherein the leg has an outward protruding pin on one the opposing sides of the leg, which is sized, positioned, and shaped to fit into the two slots; and
   wherein said outward protruding pin is formed on a flexible arm formed on the leg, the flexible arm can be depressed to move the pin inward.

5. The leg assembly of claim 4, wherein the elongated leg comprises an inflection point.

6. The leg assembly of claim 1, further comprising a bucket, said bucket comprising a rim on the bottom of said bucket, said rim being engaged between said L shaped flange and said protruding tab.

7. The leg assembly of claim 1, wherein each side of said bracket is wider at one end than the opposing end; and wherein said L shaped flange is positioned on the wider end on a surface facing side, oriented away from the opening of the U shaped mounting bracket.

8. The leg assembly of claim 4, further comprising a container, said container comprising a rim on the bottom of said container, said rim being engaged between said L shaped flange and said protruding tab.

9. The leg assembly of claim 4, wherein each side of said bracket is wider at one end than the opposing end; and wherein said L shaped flange is positioned on the wider end on a surface facing side, oriented away from the opening of the U shaped mounting bracket.

10. A container assembly comprising a bucket, an elongated leg and a substantially U shaped mounting bracket;
   said U shaped mounting bracket comprising two sides, each side of the mounting bracket comprises an outer face and an inner face, and on said inner face is disposed a mounting pocket, two slots, substantially parallel to one another and at least one of the two slots has a recess, and wherein each side is wider at one end creating an angled orientation, said U shaped bracket further comprising a surface facing side, said surfacing facing side comprising an L shaped flange with a protruding tab at the end of said flange disposed on the wider end of said bracket on said surface facing side;

wherein said flange and tab are sized and shaped to support a bottom of said bucket wherein said L shaped flange and said protruding tab grasp a rim at the bottom of the bucket between said L shaped flange and said protruding tab;

wherein the elongated leg comprises a pin disposed on opposing sides of an end of the leg is mounted so that the leg may rotate within the mounting pocket in the bracket;

wherein the leg has an outward protruding pin on one of the opposing sides of the leg, which is sized, positioned, and shaped to fit into the two slots; and wherein said outward protruding pin is formed on a flexible arm formed on the leg, the flexible arm can be depressed to move the outward protruding pin inward.

* * * * *